(12) United States Patent
Fang et al.

(10) Patent No.: US 7,693,276 B2
(45) Date of Patent: Apr. 6, 2010

(54) METHOD OF MEASURING DISTORTION AND DETERMINING RESIDUE-ECHO THRESHOLD IN LOOP START TRUNK CIRCUITS

(75) Inventors: Yonghua Fang, Ottawa (CA); Renee Johnston, Dunrobin (CA); Mirjana Popovic, Ottawa (CA); Dieter Schulz, Dunrobin (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1093 days.

(21) Appl. No.: 11/351,133

(22) Filed: Feb. 9, 2006

(65) Prior Publication Data

US 2006/0198329 A1    Sep. 7, 2006

(30) Foreign Application Priority Data

Feb. 11, 2005    (EP) .................................. 05101003

(51) Int. Cl.
  *H04M 9/08*    (2006.01)
(52) U.S. Cl. ............. 379/406.11; 370/289; 379/406.07; 379/406.13; 379/406.14
(58) Field of Classification Search ......... 370/286–289; 379/406.01, 406.11, 402, 406.02, 406.03, 379/406.05, 406.06, 406.07, 406.12, 406.13, 379/406.14
See application file for complete search history.

(56) References Cited

U.S. PATENT DOCUMENTS

| | | | | |
|---|---|---|---|---|
| 4,558,187 A | * | 12/1985 | Billi et al. | 379/402 |
| 5,008,923 A | * | 4/1991 | Kitamura et al. | 379/3 |
| 5,274,705 A | | 12/1993 | Younce et al. | 379/410 |
| 5,315,585 A | * | 5/1994 | Iizuka et al. | 370/289 |
| 6,195,430 B1 | | 2/2001 | Eriksson et al. | 379/410 |
| 6,424,635 B1 | | 7/2002 | Song | 370/286 |
| 6,678,254 B1 | * | 1/2004 | Song | 370/290 |
| 6,738,358 B2 | * | 5/2004 | Bist et al. | 370/289 |
| 2008/0187129 A1 | * | 8/2008 | Lu et al. | 379/406.06 |

* cited by examiner

*Primary Examiner*—Fan Tsang
*Assistant Examiner*—Simon King

(57) ABSTRACT

A method of determining residue-echo threshold for the trans-hybrid echo path of a loop start (LS) trunk line, comprising the steps of estimating the impulse response of the trans-hybrid echo path, passing a speech-like signal through the LS trunk circuit and collecting the echo signal. The collected echo signal is compared to the convolution of the speech-like signal with the estimated impulse response. The difference between the convolution result and the collected echo signal is the residue echo, which represents the effect of nonlinearity. With different levels of excitation signal, a curve of residue echo power level against input signal level is obtained, and the distortion characteristics are derived from this curve.

5 Claims, 4 Drawing Sheets

METHOD OF MEASURING DISTORTION AND DETERMINING RESIDUE-ECHO THRESHOLD IN LOOP START TRUNK CIRCUITS

FIELD OF THE INVENTION

The present invention relates generally to communication systems, and more particularly to a method of measuring distortion and determining residue-echo threshold for a loop start (LS) trunk line between a Private Branch Exchange (PBX) and Central Office (CO).

BACKGROUND OF THE INVENTION

The signal path between two telephones, involving a call other than a local one, requires amplification using a four-wire circuit. The cost and cabling required discourage extending a four-wire circuit to a subscriber's premise (i.e. Private Branch Exchange (PBX)) from the local exchange or Central Office (CO). For this reason, the four-wire trunk circuits are coupled to two-wire local circuits, using a device called a hybrid. Thus, when a PBX is connected to the CO through a Loop-Start (LS) trunk Line, the hybrid couples the analog signal from the four-wire circuit (where incoming and outgoing signals are separated) to the two-wire circuit where the incoming and outgoing signals are combined.

Unfortunately, by its nature the hybrid is a leaky device. As signals pass from the four-wire to the two-wire portion of the network, the energy in the four-wire section is reflected back, creating an echo of the signal. The intensity of the echo depends on how well the impedance is matched between both sides of the hybrid. The impedance of the two-wire circuit can vary wildly depending on factors including the line set-up in the CO equipment, the distance between CO and PBX, the electrical characteristics of the wire, etc. Provided that the total round-trip delay occurs within just a few milliseconds, the echo generates a sense that the call is 'live' by adding sidetone, thereby making a positive contribution to the quality of the call.

In cases where the total network delay exceeds 36 ms, however, the positive benefits disappear, and intrusive echo results. The actual amount of signal that is reflected back depends on how well the balance circuit of the hybrid matches the two-wire line. In the vast majority of cases, the match is poor, resulting in a considerable level of signal being reflected back.

It is known in the art to employ Line Echo Cancelers (LECs) to address hybrid echo cancellation in Voice-Over-IP (VoIP) systems. Most LECs use the well-known Normalized Least Mean Square (NLMS) algorithm to adapt a linear Finite Impulse Response (FIR) filter, so that the FIR filter matches the transfer-function of the echo path and provides a counter-signal to cancel the echo.

Because of the linear nature of the FIR filter and NLMS algorithm, LECs work well only if the echo path is truly linear. In reality, the LS trunk line circuit may contain some degree of nonlinear effects resulting from operating characteristics of power amplifiers and D/A, A/D converters, especially when a large signal (e.g. a loud speech signal) is present. Additional nonlinear sources include noise on the line, overshoot of line filters and quantization error of CODECs in digital systems. All of these sources create nonlinear components to the echo channel, which cannot be modeled by a linear FIR filter.

Moreover, adapting on such a nonlinear echo can result in a loss of divergence in a well-converged FIR filter, giving rise to annoying echo bursts before the FIR filter re-converges. The portion of the echo that cannot be canceled by the linear FIR filter is referred to in the art as "residue echo". If the residue echo is lower than a predefined threshold, a Non-Linear Processor (NLP) can be used to replace the residue echo with comfort noise. However, reducing the residue echo to below this threshold is difficult using an online adaptive procedure, because the nonlinearity is buried in the training signal.

Clearly, a well-matched four-wire circuit gives little echo and less distortion, making the echo-canceling task easier. However, the selection of a best set of matching impedance settings for a specific LS trunk Line is currently very objective, mainly based on experience using trial and error. Such manual measurement consumes enormous human effort and time.

SUMMARY OF THE INVENTION

According to one aspect of the present invention, offline measurements are performed in an effort to determine the characteristics of the LS circuit. More particularly, it is an object of an aspect of the invention to provide a method of measuring the nonlinearity of an LS trunk circuit using estimated impulse response and therefrom to provide the Residue-Echo threshold.

In one aspect, a method is provided for measuring an estimate of the impulse response of the LS trunk circuit. Next, a speech-like signal is passed through the LS trunk circuit and the echo signal is collected. The speech-like signal is also convoluted with the estimated impulse response to obtain a convolution result. The difference between the convolution result and the collected echo signal is the residue echo, which can be considered as the effect of nonlinearity. With different levels of excitation signal, a curve of residue echo power level against input signal level is obtained, and the distortion characteristics are derived from this curve.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
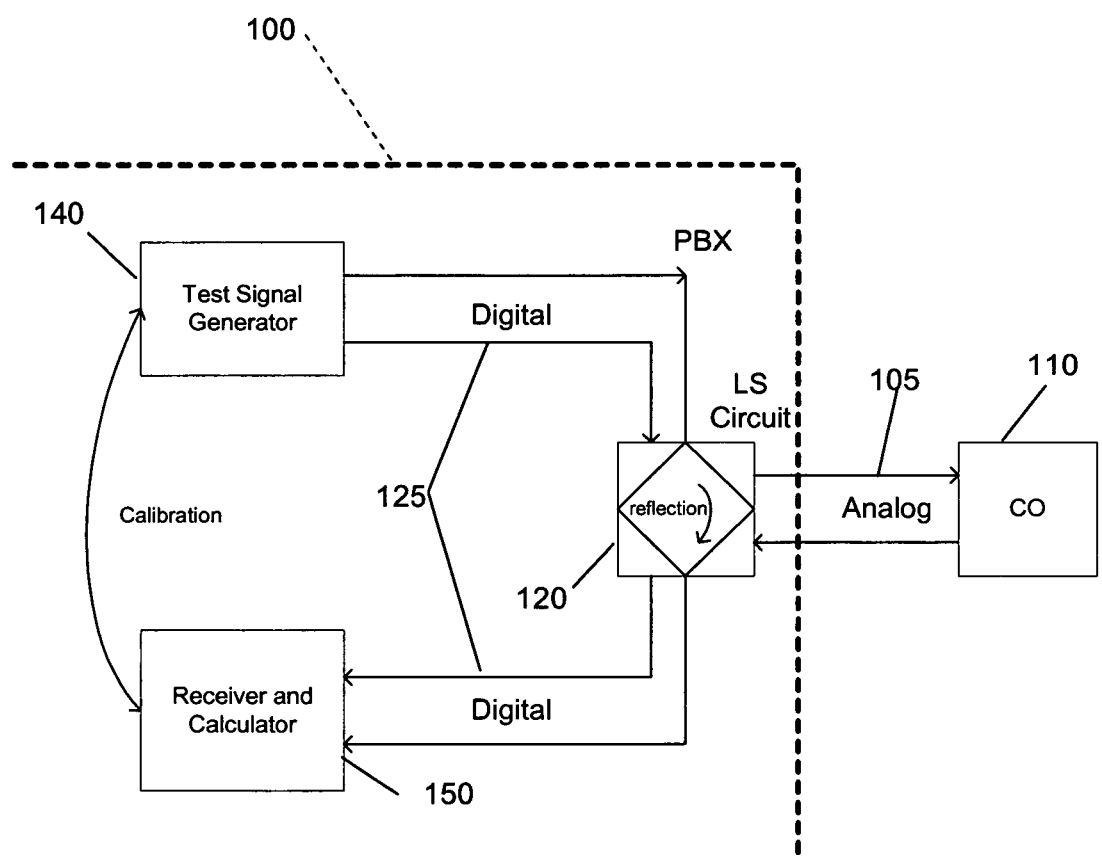
FIG. 1 is a schematic representation of a test configuration for implementing the method according to the present invention.

Turning first to FIG. 1, a PBX 100 is shown connected via a two-wire local line 105 to a CO 110. A hybrid 120 converts the signals between two-wire line 105 and the four-wire lines 125 within the PBX 100. However, as discussed above, impedance mismatch between the two-wire line 105 and four-wire line 125 gives rise to trans-hybrid echo.

According to the present invention, a method is provided for measuring distortion and determining residue-echo threshold for the loop start (LS) trunk circuit including hybrid 120 and the attached LS trunk line 105 between PBX 100 and the CO 110, using a test signal generator 140 (typically a Digital Signal Processor (DSP)) and a receiver and calculator 150.

Figure 2:
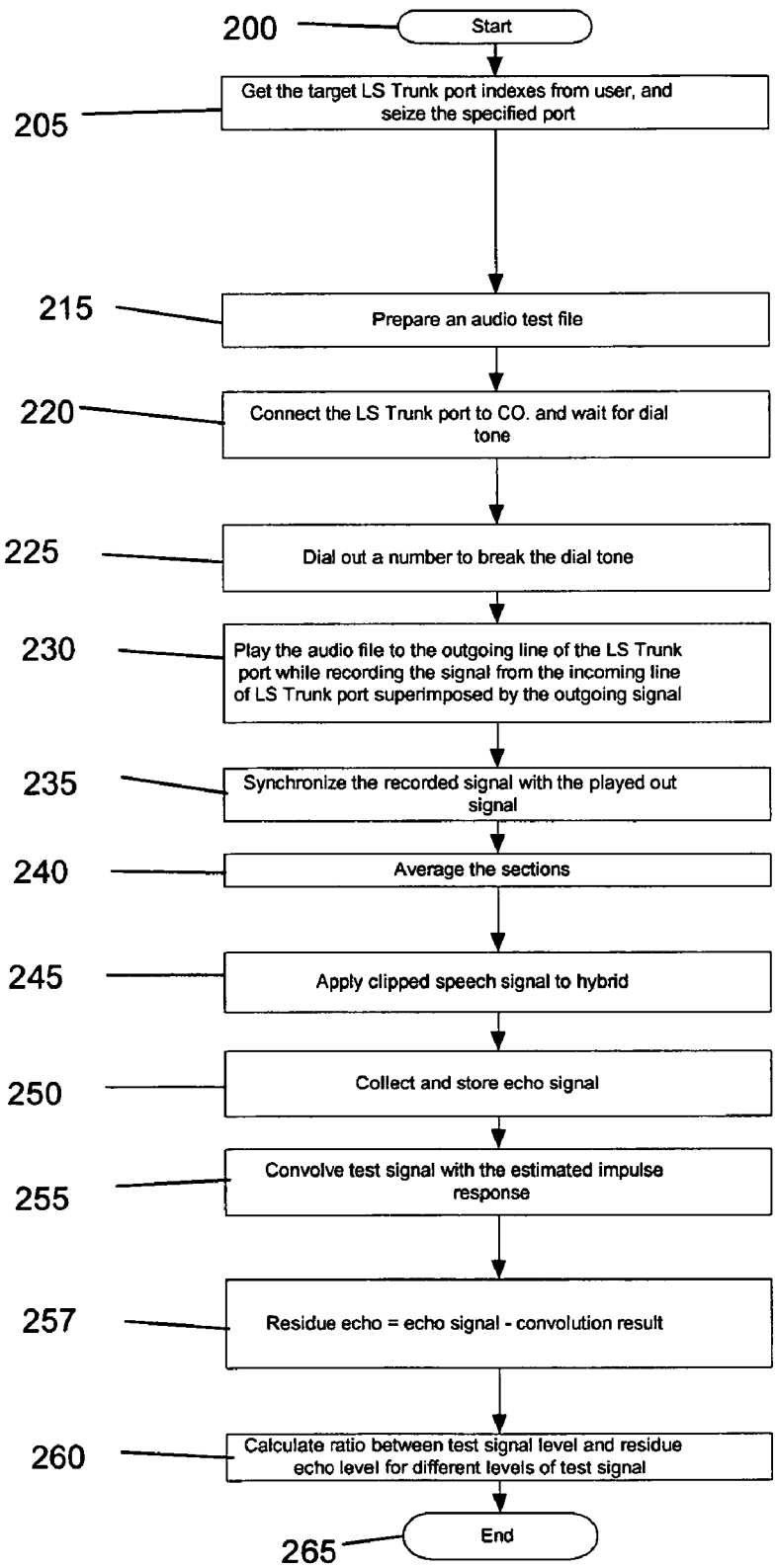
FIG. 2 is a flowchart of the method according to a preferred embodiment of the present invention.

Turning now to FIG. 2, the measurement procedure of the preferred embodiment is set forth. First, an estimate of the time-domain trans-hybrid transfer function is obtained (beginning at step 200). This involves the controller 150 retrieving the target LS trunk port indexes and seizing the specified port (step 205).

Next, an audio test file is prepared (step 215). For example, the audio file may contain a number (e.g. 5) consecutive impulse signals spaced apart from one another (e.g. 200 ms apart).

The LS trunk port is then connected to the CO 110, and the receiver and calculator 150 waits for dial tone (step 220).

Upon detection of dial tone, the receiver and calculator 150 dials out a number (e.g. the CO silence termination number) to break the dial tone, and create silence on the line (step 225).

The DSP 140 then plays the audio file to the outgoing line of the LS trunk interface (step 230), and at the same time receiver and calculator 150 records the signal coming back from the incoming line of the LS trunk port, superimposed by the outgoing signal. The receiver and calculator 150 then releases the LS trunk port.

The receiver and calculator 150 then synchronizes the recorded signal with the played out signal by locating the impulses in the recorded signal (step 235). A predetermined number of audio samples are truncated after each impulse (e.g. in the preferred embodiment 128 samples are truncated, i.e. 16 ms).

Next, the consecutive sections of the recorded signal are averaged (e.g. averaging the five groups of samples to obtain a final audio sample). This averaging procedure (step 240) decreases the effect of random noise on the line as well as digital truncation error.

Steps 205 to 240 result in obtaining the time-domain trans-hybrid transfer function, which may be expressed as follows:

Let $h'_k(n)$ denote the $k_{th}$ of impulse response and A as the amplitude of the impulse signal, then the final estimated impulse response is:

$$h'(n) = \frac{\sum_{k=1}^{5} h'_k(n)}{5A}, \quad n = 0, \ldots 127 \qquad (1)$$

Figure 3:
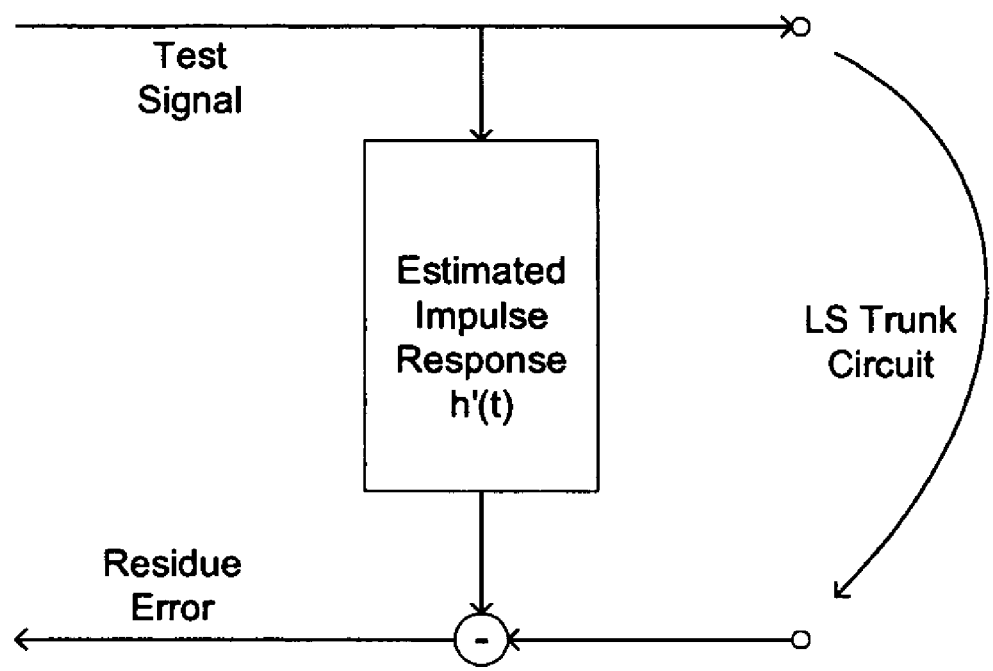
FIG. 3 is a schematic representation of distortion measurement structure according to the present invention.

Next, the residue echo is measured based on the estimated impulse response using the structure illustrated in FIG. 3.

At step 245, a further test signal is generated in generator 140 and applied to the hybrid 120. Preferably, a test signal is chosen (e.g. clipped speech) to cause distortion in the LS trunk circuit. The echo signal is then collected and stored (step 250).

The test signal is then convoluted with the estimated impulse response (step 255). This convolution result is compared with the stored echo signal. The difference between these two is considered as the residue echo and its level is calculated (step 257).

The ratio between test signal level and residue echo level is then calculated (step 260). Different levels of test signal are sent and the corresponding ratios are recorded. For example, the overall array of levels may be L=[0, −1, −2, −3, −4, −5, −6, −7, −8, −9, −10, −11, −13, −15, −17, −19, −21, −23, −25, −27]. Each element, $L_k$, is the relative level to the maximum level $L_0$, where $L_0$ is the amplitude of the test signal that results in maximum CODEC word. In other words, the signal at maximum CODEC level is attenuated by a factor $L_k$.

Thus, letting $r_k(n)$ be the $k_{th}$ test signal sent out and $s_k(n)$ be the corresponding $k_{th}$ echo signal collected, then the $k_{th}$ residue echo $e_k(n)$ can be written as:

$$e_k(n) = s_k(n) - conv[r_k(n), h'(t)],$$

$$t=0, \ldots 127, n=0 \ldots length(r_k), k=1 \ldots 20 \qquad (2)$$

and the ratio of $k_{th}$ test signal level and residue echo level $J_k$ is:

$$J_k = 10\log_{10} \left[ \frac{\sum_{n=0}^{length(R_k)} r_k^2(n)}{\sum_{n=0}^{length(R_k)} e_k^2(n)} \right], \quad k = 1 \ldots 20 \qquad (3)$$

Although the estimated impulse response is not the true impulse response of the LS trunk circuit, it is a practical estimate of what the LEC can achieve after the NLMS linear adaptation. The difference between estimated and the true impulse response is mostly contributed by the line noise and quantization effects.

Thus, if the true impulse response is denoted as $h(n)$, then:

$$h_\Delta(n) = h'(n) - h(n). \qquad (4)$$

Taking the Fourier Transform of both sides of equation (4):

$$H_\Delta(\omega) = H'(\omega) - H(\omega) \qquad (5)$$

Transforming $e_k(n)$ into frequency domain results in:

$$E_k(\omega) = S_k(\omega) - R_k(\omega)H'(\omega) \qquad (6)$$
$$= S_k(\omega) - R_k(\omega)H(\omega) - R_k(\omega)H_\Delta(\omega), \quad k = 1 \ldots 20$$

The echo signal $s_k(n)$ contains the effect of nonlinear components and can be decomposed into a linear part and a nonlinear part:

$$s_k(n) = conv[r_k(n), h(t)] + s'_k(n). \qquad (7)$$

Taking the Fourier transform of both sides of equation (7):

$$S_k(\omega) = R_k(\omega)H(\omega) + S'_k(\omega) \qquad (8)$$

Substituting $S_k(\omega)$ into equation (6):

$$E_k(\omega) = R_k(\omega)H(\omega) + S'_k(\omega) - R_k(\omega)H(\omega) - R_k(\omega)H_\Delta(\omega) \qquad (9)$$
$$= S'_k(\omega) - R_k(\omega)H_\Delta(\omega), \quad \text{for } k = 1 \ldots 20$$

Using Parseval's theorem, equation (3) can be re-written as:

$$J_k = 10\log_{10}\left[\frac{R_k(\omega)^2}{E_k(\omega)^2}\right] \qquad (10)$$
$$= 10\log_{10}\left[\frac{R_k(\omega)^2}{S'_k(\omega)^2 + [R_k(\omega)H_\Delta(\omega)]^2 - 2S'_k(\omega)[R_k(\omega)H_\Delta(\omega)]^T}\right],$$

$$k = 1 \ldots 20$$

Assuming the nonlinear components are uncorrelated to the line noise and quantization errors, then $S'_k(\omega)[R_k(\omega)H_\Delta(\omega)]^T \approx 0$, so equation (10) can be written as:

$$J_k \approx -10\log_{10}\left[H_\Delta(\omega)^2 + \frac{S'_k(\omega)^2}{R_k(\omega)^2}\right], \quad k = 1\ldots 20 \quad (11)$$

If the nonlinear component $S'_k(\omega)$ is very small compared to $H_\Delta(\omega)$ or proportional to signal level $R_k(\omega)$, then $J_k$ will be constant for all $L_k$. If $S'_k(\omega)$ grows faster than $R_k(\omega)$, which is typical when a nonlinear LS trunk circuit is under test, then $J_k$ will become smaller when the signal level $L_k$ is larger.

Figure 4:
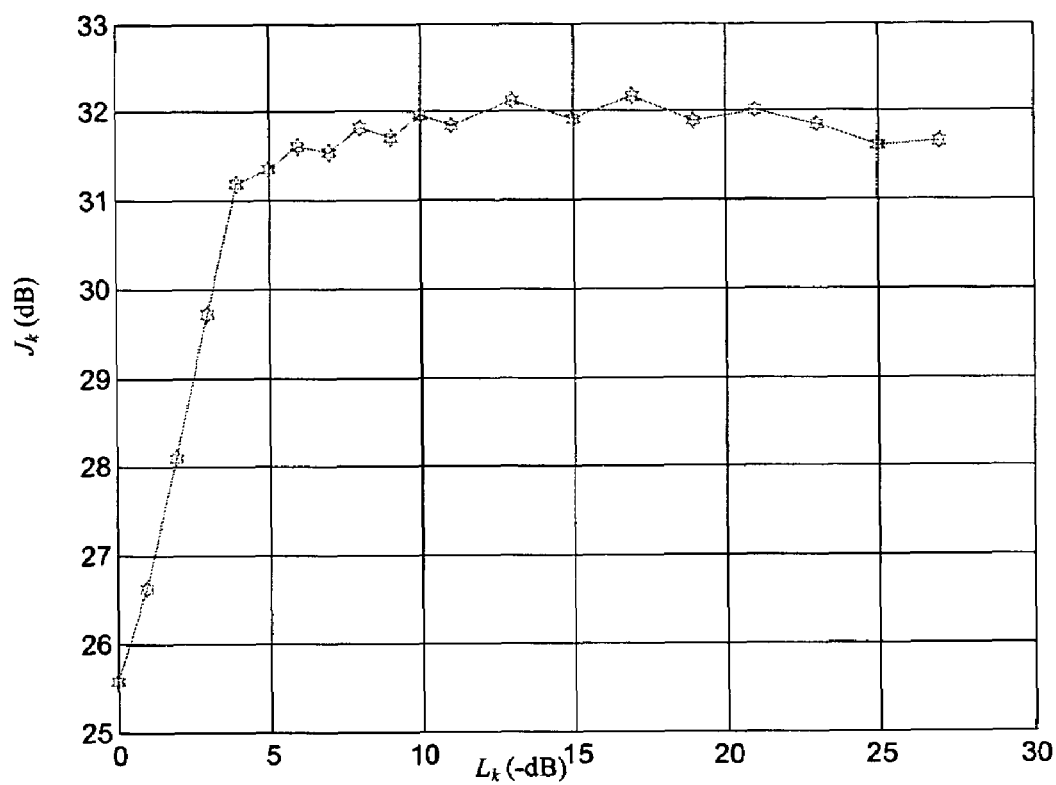
FIG. 4 is a curve showing distortion measurement for determining residue echo, according to the preferred embodiment.

After the test is done (step 265), a curve of $J_k$ against levels $L_k$ can be plotted, as shown in FIG. 4.

A typical curve of distortion measurement consists of a flat line (indicating constant distortion relative to signal level in the LS trunk circuit) with a dip at the curve's critical point (derivative zero). The critical point of the curve indicates the onset of non-constant distortion and its corresponding level $L_k$ is the maximum level that can be used for constant distortion. On the other hand, the residue echo threshold with respect to a particular signal level is the corresponding value of $J_k$ on the curve.

The flat line portion representing the area of constant distortion influences the upper bound of convergence depth of the echo canceler. The echo canceler cannot cancel a signal beyond this relative level. For example, if the flat line is at 32 dB, the echo canceler's convergence depth will be bounded by approximately 32 dB.

As shown in FIG. 1, the method of the present invention is preferably implemented within a PBX 100. A test signal generator 140 and receiver and calculator 150 are used to determine whether a particular analogue trunk line can be used in conjunction with certain PBX equipment and provide adequate echo cancellation. The apparatus of the present invention may be used by equipment installers to qualify customer lines for use with voice over IP systems, and to determine what particular settings of the PBX 100 should be used to provide adequate echo cancellation.

Incorporating the measurement system (i.e. test signal generator 140 and receiver and calculator 150) within the PBX 100 allows for automatic adjustment of the PBX to provide optimal echo cancellation, reduces installation time and effort and also compensates for situations where a trunk provider changes the line characteristics.

It will be appreciated that, although embodiments of the invention have been described and illustrated in detail, various modifications and changes may be made. For example, different numbers of impulse signals may be played out, and other, non-impulse test signals may be used to measure the impulse response (e.g. sine wave with different frequency, etc.). Also, the principles of the present invention may be used in an Acoustic Echo Canceler to measure the nonlinear characteristic of analog front-end and plastic components. In this application, the echo results form the acoustic coupling of the plastic between speaker and microphone and the reflection of sound from the environment. The nonlinear sources are the line noise, quantization effects, front end circuit distortion, and plastic distortion. All such alternatives and modifications are believed to be within the scope of the invention as defined by the claims appended hereto.

What is claimed is:

1. A method of determining residue-echo threshold for a trans-hybrid echo path of a loop start trunk line, comprising:
   estimating an impulse response of said trans-hybrid echo path;
   applying a plurality of test signals to said trans-hybrid echo path and storing resulting respective echo signals, the test signals comprise clipped speech signals to cause distortion in said loop start trunk line;
   convoluting said test signals with said impulse response resulting in a plurality of convolution results;
   subtracting said convolution results from said respective echo signals resulting in respective residue-echo values $J_k$;
   storing said respective residue-echo values $J_k$ as a function of respective ones of said test signals; and
   determining said residue-echo threshold as a residue-echo value associated with a predetermined one of said test signals beyond which said residue-echo values remain substantially constant with increasing levels of said test signals.

2. The method of claim 1, wherein said estimating the impulse response of said trans-hybrid echo path comprises applying an audio signal containing at least one impulse to said loop start trunk line while simultaneously recording a return signal from said loop start trunk line, and locating said at least one impulse in the return signal.

3. The method of claim 2, further comprising averaging consecutive sections of the return signal to decrease random noise effects on the line and digital truncation error.

4. The method of claim 1, wherein said plurality of test signals are characterized by different amplitude levels, $L_k$, where $L_k$ is the relative level of a respective one of said test signals to a maximum level $L_o$, and wherein $L_o$ is the amplitude of a predetermined one of said test signals that results in a maximum CODEC word.

5. The method of claim 4, further comprising plotting said respective residue-echo values $J_k$ as a function of said different amplitude levels $L_k$, resulting in a curve in connection with which a flat line portion indicates constant distortion relative to signal level in said loop start trunk line and a critical point in said curve denotes the residue echo threshold and onset of non-constant distortion.

* * * * *